US012808495B2

(12) United States Patent
Gray et al.

(10) Patent No.: US 12,808,495 B2
(45) Date of Patent: Nov. 24, 2026

(54) ARTIFICIAL LIGHTING DEVICES AND SYSTEMS FOR SHELTER SYSTEMS

(71) Applicant: Jameson, LLC, Clover, SC (US)

(72) Inventors: Damón Gray, Huntersville, NC (US); Christopher Ryan Willis, Belmont, NC (US); Carlos Fernando Becerra Alvarado, Charlotte, NC (US)

(73) Assignee: Jameson, LLC, Clover, SC (US)

( * ) Notice: Subject to any disclaimer, the term of this patent is extended or adjusted under 35 U.S.C. 154(b) by 0 days.

(21) Appl. No.: 18/564,365

(22) PCT Filed: Jul. 20, 2023

(86) PCT No.: PCT/US2023/070611
§ 371 (c)(1),
(2) Date: Nov. 27, 2023

(87) PCT Pub. No.: WO2025/019021
PCT Pub. Date: Jan. 23, 2025

(65) Prior Publication Data
US 2026/0117941 A1 Apr. 30, 2026

(51) Int. Cl.
*F21L 2/00* (2006.01)
*F21V 5/00* (2018.01)
(Continued)

(52) U.S. Cl.
CPC ................ *F21L 2/00* (2013.01); *F21V 5/002* (2013.01); *F21V 21/0832* (2013.01);
(Continued)

(58) Field of Classification Search
CPC ........ F21L 2/00; F21V 5/002; F21V 21/0832; F21V 23/008; F21V 23/006
See application file for complete search history.

(56) References Cited

U.S. PATENT DOCUMENTS 7,374,315 B2 * 5/2008 Dorsey .................... F21S 43/14 362/800
8,491,155 B1 * 7/2013 Cherry, II .............. H05B 45/20 362/249.02
(Continued)

OTHER PUBLICATIONS

International Search Report and Written Opinion issued in Corresponding International Application No. PCT/US2023/070611, issued on Dec. 12, 2023, 9 pages.

*Primary Examiner* — Matthew J. Peerce
(74) *Attorney, Agent, or Firm* — Shumaker, Loop & Kendrick, LLP; S. Alexander Long, Jr.; Lloyd J. Wilson

(57) ABSTRACT

Lighting systems include electrically interconnected lighting devices, each of which includes a flexible lighting panel comprising a first side and a second side, the first side including hook strip(s) configured to be coupled to loop strip(s) integrated with elongated strap(s) of a transportable shelter system, the second side configured as a substrate facilitating light emission toward an area proximate the transportable shelter system. The flexible lighting panel includes at least one light casing positioned proximate the second side and including LED(s) positioned between the at least one light casing and the second side, the at least one light casing including light diffusing material configured to diffuse light emitted by the LED(s). Lighting systems also include at least one power supply electrically connected via electrical connector(s) to lighting device(s), a controller electrically connected via at least one electrical connector to the at least one power supply, and the elongated strap(s).

17 Claims, 11 Drawing Sheets

(51) Int. Cl.

*F21V 21/08* (2006.01)
*F21V 23/00* (2015.01)
*F21V 23/06* (2006.01)
*F21Y 113/13* (2016.01)
*F21Y 115/10* (2016.01)

(52) U.S. Cl.

CPC ............ *F21V 23/008* (2013.01); *F21V 23/06* (2013.01); *F21Y 2113/13* (2016.08); *F21Y 2115/10* (2016.08)

(56) References Cited

U.S. PATENT DOCUMENTS

| | | | | |
|---|---|---|---|---|
| 10,107,488 | B2 | 10/2018 | Song et al. | |
| 11,346,531 | B2 * | 5/2022 | Brown | F21V 21/0832 |
| 2004/0233659 | A1 * | 11/2004 | Chen | F21V 33/0052 362/85 |
| 2012/0188756 | A1 | 7/2012 | Kokoski et al. | |
| 2016/0091185 | A1 * | 3/2016 | Soderholm | F21S 2/00 362/11 |
| 2016/0281974 | A1 | 9/2016 | Song et al. | |

* cited by examiner

ARTIFICIAL LIGHTING DEVICES AND SYSTEMS FOR SHELTER SYSTEMS

CROSS-REFERENCE TO RELATED APPLICATIONS

This application is a United States 371 national stage application tracing priority to and claiming benefit of Patent Cooperation Treaty (PCT) Application No. PCT/US23/070611 filed Jul. 20, 2023, entitled ARTIFICIAL LIGHTING DEVICES AND SYSTEMS FOR SHELTER SYSTEMS, and the present application is also related to U.S. Pat. No. 10,107,488 issued on Oct. 23, 2018, entitled "Flexible LED Substrate Device," the entire contents of both of which are hereby expressly incorporated herein by reference.

FIELD OF THE INVENTION

This invention relates generally to lighting devices and systems, and more particularly, embodiments of the invention relate to lighting devices and systems for both soft and rigid shelter systems.

BACKGROUND OF THE INVENTION

Soft-wall shelter systems, such as those used with modular command post systems (MCPS) or other lightweight maintenance enclosures (LME) include modular structures (e.g., structures with walls made of fabrics, flexible polymers, tarpaulins, etc.) that can allow for quick assembly and high durability. Example soft-wall shelter systems may be used as living quarters, personnel workplace, mess halls, vehicle storage, aircraft hangars, and/or equipment storage. In general, these soft-wall shelter systems can incorporate climate control systems, areas that incorporate walls and doors, electrical systems, etc. In some instances, rigid-wall shelter systems may include, for example, shelter systems that incorporate container-based shelters that can be easily transported and deployed due to a lightweight frame that supports structural panels. Such rigid-wall shelter systems may incorporate self-supporting floors as well as gas spring and winch-assisted ceiling and floor panels. In some instances, rigid-wall shelters may incorporate expandable sections that include soft-wall shelter sections.

Such soft-wall shelter systems and rigid-wall shelter systems may remain assembled for as long as a mission or job is active, which may last several months or years. Due to the nature of these shelter systems, artificial lighting systems may be built or incorporated into the structures in order to provide sufficient lighting. However, soft-wall and rigid-wall shelter systems also may need to be continually moved to different locations, which requires continual assembly and breakdown. Existing artificial lighting systems used for soft-wall and rigid wall shelter systems are often not compatible with the rigors demanded during the continual assembly and breakdown of shelter systems. In particular, existing artificial lighting systems incorporate lamps that do not conform well to the demands of a folding structure and are subject to damage. Further, existing artificial lighting systems often incorporate rigid and heavy lamps that require the structure of the shelter system to be load bearing such that the shelter system structure can support the weight of attaching the lamps to the interior of the shelter system. In addition, existing artificial lighting systems also produce high heat, which is potentially dangerous if the surface of the lamp is in contact with the tent fabric (e.g., tent lining) since it could present a fire hazard. Further, existing lamps consume relatively high amounts of power, which often needs to be conserved when these modular structures are assembled in remote locations.

Thus, a need exists for improved lighting devices and systems that are lightweight, produce little heat, and can withstand the rigors of frequent mobility during assembly and takedown for various shelter systems.

BRIEF SUMMARY

Shortcomings of the prior art are overcome and additional advantages are provided through the provision of a lighting system that includes a plurality of electrically interconnected lighting devices. Each lighting device of the electrically interconnected lighting devices includes a flexible lighting panel that includes a first side and a second side, the first side including one or more hook strips configured to be coupled to one or more loop strips integrated with at least one elongated strap configured to be coupled to a transportable shelter system, the second side configured as a substrate facilitating light emission toward an area proximate the shelter system. The flexible lighting panel includes at least one light casing positioned proximate the second side and including one or more LEDs positioned between the at least one light casing and the second side, the at least one light casing including a light diffusing material configured to diffuse light emitted by the one or more LEDs. Further, the lighting system includes at least one power supply electrically connected via one or more electrical connectors to one or more lighting devices of the plurality of electrically interconnected lighting devices, and a controller electrically connected via at least one electrical connector to the at least one power supply. The lighting system also includes the at least one elongated strap that includes the one or more loop strips and that is configured to be coupled to the transportable shelter system.

The shelter system may be configured to be assembled and disassembled multiple times throughout its useful life.

Each casing of the at least one light casing may comprise the one or more LEDs positioned between the at least one light casing and the first side, where the one or more LEDs comprise a plurality of LEDs, and each LED of the plurality of LEDs is configured to emit a respective color.

At least one power supply may comprise at least one hook for temporarily hanging the at least one power supply to an anchor point of the transportable shelter system.

The one or more LEDs may comprise a plurality of LEDs, where the plurality of LEDs may comprise RGBW LEDs.

The at least one elongated strap may be configured to extend across a length of a ceiling of the transportable shelter system and the one or more loop strips are integrated on a first side of the elongated strap, where the elongated strap further includes a fabric material, a fastener that is configured to adjust a length of the elongated fabric strap and that is positioned at an end of the elongated fabric strap, where the end is positioned at an anchor point of the ceiling of the transportable shelter system, at least one additional loop strip integrated on a second side of the elongated strap, the second side being opposite the first side, and a flap extending from the second side and comprising a hook strip, wherein the flap is configured to fold over to form a channel by temporarily attaching the hook strip to the at least one additional loop strip, wherein the channel formed by folding over the flap is configured to encase the one or more electrical connectors.

The at least one elongated strap may include at least two elongated fabric straps positioned a distance apart along the length of the ceiling of the transportable shelter system, each of the at least two elongated fabric straps being connected to the one or more hook strips of the flexible lighting panel.

The at least one power supply may comprise a plurality of power supplies electrically connected in series.

The at least one power supply may comprise a plurality of power supplies and the controller may be configured to control each of the plurality of power supplies.

The controller may comprise a user interface that includes a plurality of illuminated input controls.

The at least one power supply may also include a plurality of quick-action connection points, disposed at multiple locations on a housing of the power supply, to which respective terminal ends of the one or more electrical connectors are connected and wherein the at least one electrical connector that electrically connects the controller to the at least one power supply comprises a flex connector directly attached to the housing and an extension cable connected at a first end to the flex connecter and connected at an opposite second end to the at least one power supply.

Each power supply of the at least one power supply may be configured to power multiple lighting devices of the plurality of electrically interconnected lighting devices.

The controller may comprise at least one hook for temporarily hanging the controller to an anchor point of the transportable shelter system.

Also disclosed herein is a lighting device that includes a flexible lighting panel that includes a first side and a second side, the first side including one or more hook strips configured to be coupled to one or more loop strips integrated with at least one elongated strap configured to be coupled to a transportable shelter system, the second side configured as a substrate facilitating light emission toward an area proximate the transportable shelter system. The flexible lighting panel includes at least one light casing positioned proximate the second side and including one or more LEDs positioned between the at least one light casing and the second side, the at least one light casing including a light diffusing material configured to diffuse light emitted by the one or more LEDs.

The transportable shelter system may be configured to be assembled a disassembled multiple times throughout its useful life.

Each casing of the at least one light casing may comprise the one or more LEDs positioned between the at least one light casing and the first side, wherein the one or more LEDs comprising a plurality of LEDs, and each LED of the plurality of LEDs is configured to emit a respective color.

The lighting device may be configured to be electrically connected to a first end of an electrical cable, the electrical cable comprising a length extending from the first end to a second end opposite the first end, and wherein the electrical cable is configured to electrically connect the lighting device to a power supply.

The one or more LEDs may comprise a plurality of LEDs, wherein the plurality of LEDs comprise RGBW LEDs.

The at least one elongated strap may be configured to extend across a length of a ceiling of the transportable shelter system and the one or more loop strips are integrated on a first side of the elongated strap, wherein the at least one elongated strap further includes a fabric material, a fastener that is configured to adjust a length of the elongated strap positioned at an end of the elongated strap, wherein the end is positioned at an anchor point of the ceiling of the transportable shelter system, at least one additional loop strip integrated on a second side of the elongated strap, the second side being opposite the first side, and a flap extending from the second side and comprising a hook strip, wherein the flap is configured to fold over to form a channel by temporarily attaching the hook strip to the at least one additional loop strip, wherein the channel formed by folding over the flap is configured to encase the one or more electrical connectors.

The at least one elongated strap may comprise at least two elongated fabric straps positioned a distance apart along the length of the ceiling, each of the at least two elongated fabric straps being connected to the one or more hook strips of the flexible lighting panel.

Additional features and advantages are realized through the concepts described herein.

BRIEF DESCRIPTION OF THE DRAWINGS

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION

Figure 1:
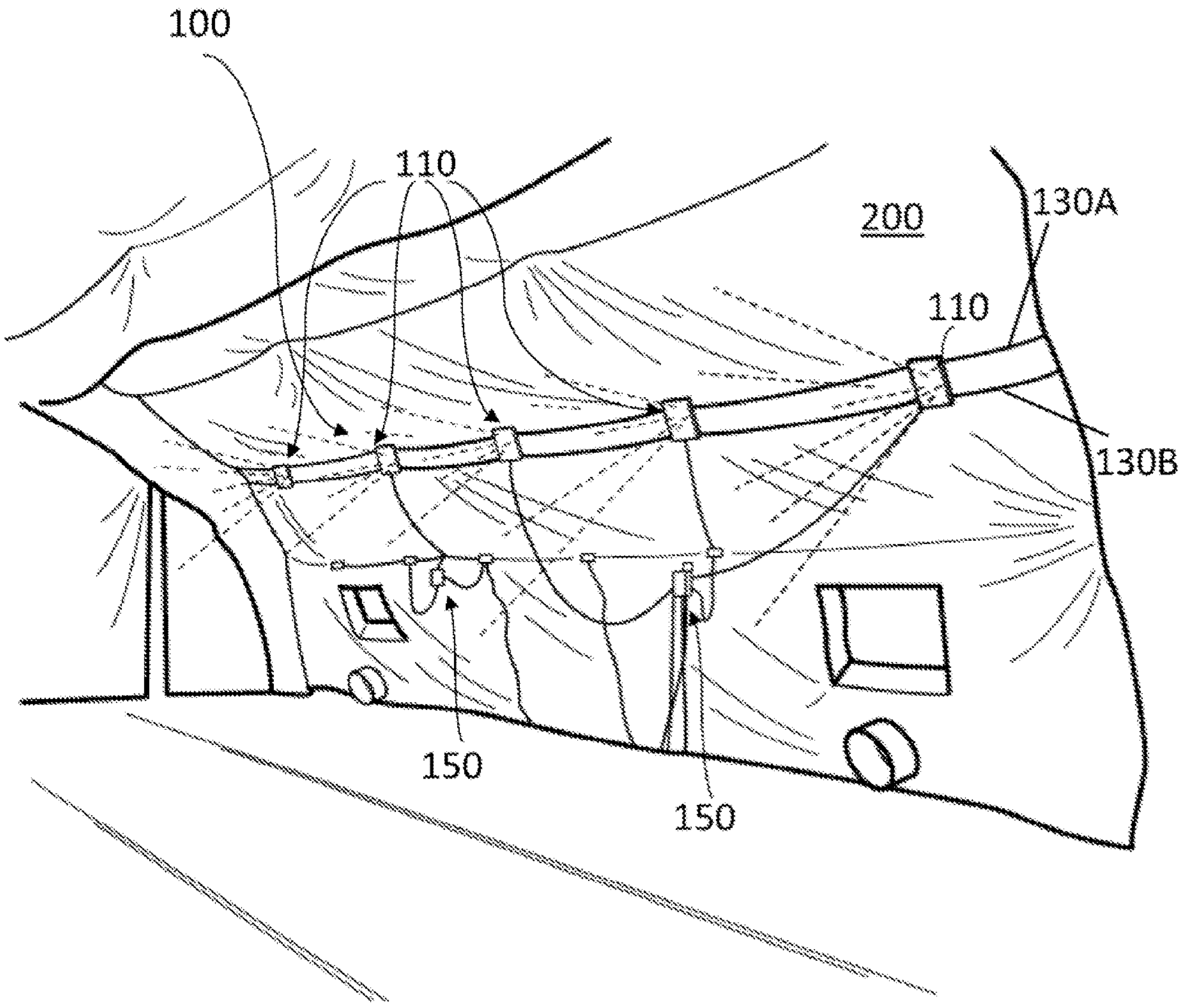
FIG. 1 depicts an example lighting system installed within a shelter system, according to an implementation of the present disclosure.

Aspects of the present invention and certain features, advantages, and details thereof are explained more fully below with reference to the non-limiting examples illustrated in the accompanying drawings. It is to be understood that the disclosed embodiments are merely illustrative of the present invention and the invention may take various forms. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

Descriptions of well-known processing techniques, systems, components, etc. may be omitted to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Like numbers refer to like elements throughout.

Unless defined otherwise, technical and scientific terms used herein have the same meaning as commonly understood to one of ordinary skill in the art to which the presently disclosed subject matter pertains. The specification may include references to "one embodiment", "an embodiment", "various embodiments", "one or more embodiments", etc. may indicate that the embodiment(s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Unless described or implied as exclusive alternatives, features throughout the drawings and descriptions should be taken as cumulative, such that features expressly associated with some particular embodiments can be combined with other embodiments. In addition, numerous inventive aspects and features are disclosed herein, and unless inconsistent, each disclosed aspect or feature is combinable with any other disclosed aspect or feature as desired for a particular embodiment of the concepts disclosed herein.

The terms "couple", "coupled", "couples", "coupling", and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. Additionally, "electrically coupled" and the like should be broadly understood and include coupling involving any electrical signal, whether a power signal, a data signal, and/or other types or combinations of electrical signals.

In addition, as used herein, the terms "about", "approximately", or "substantially" for any numerical values or ranges indicate a suitable dimensional tolerance that allows the device, part, or collection of components to function for its intended purpose as described herein.

Disclosed herein are example lighting devices and systems. The disclosed invention overcomes shortcomings of existing technology because these lighting devices and systems do not require removal prior to each breakdown and assembly cycle for moving a modular shelter system (e.g., soft-walled and rigid-walled shelter systems). For existing artificial lighting systems, lamps are typically removed before each breakdown cycle and reinstalled during assembly. This cyclical removal and installation creates additional work because the lamps are generally installed at or near the highest points of the shelters and ladders or other assistive devices are needed to install or removal of the lamps, but that are not practical for expeditionary missions where soft-wall and rigid-wall shelter systems are often used. In addition, the cyclical removal and installation exerts additional wear and tear on the lamps, which can lead to damage of the lamps. In contrast, the disclosed lighting devices and systems allow lighting devices to be easily attached to the interior of a shelter system and remain attached during breakdown and assembly. Further, the disclosed lighting systems provide additional advantages by being lightweight, which eliminates the need for the lamps to be placed near a load-bearing support on the shelter system. Advantageously, the heat output and the power consumption of the disclosed devices and systems is reduced, which reduces the hazards associated with the lamps coming into contact with the fabric and puts less strain on the power supply for the modular shelter systems. In some embodiments, the disclosed lighting systems are also configured to illuminate with non-white light (i.e., blackout illumination), which may be desirous in a military context for stealth environments or may be beneficial for stargazing in other non-military applications. A "black-out" illumination mode refers to the non-white light coloring selected (e.g., red, blue, green, etc.).

The lighting systems incorporate panels that are designed to provide lamps with full illumination power continuously (i.e., without any time limits for light availability) at ambient temperature environments.

FIG. 1 depicts a lighting system 100 installed within a shelter system 200 (e.g., a transportable shelter such as a soft-wall or rigid-wall shelter), according to an implementation of the present disclosure. The lighting system 100 includes a plurality of electrically interconnected lighting devices 110 located on the interior of the shelter system 200 as well as at least one power supply 150 also located on the interior of the shelter system 200. Each power supply 150 may be electrically coupled, via electrical connector(s), to multiple lighting devices 110 of the plurality of interconnected lighting devices 110. The lighting devices are spaced throughout the shelter system 200 including along a ceiling of the shelter system 200. Advantageously, due to the composition of the lighting devices 110, which includes a flexible LED substrate, the lighting devices 110 do not need to be removed for each breakdown cycle of the shelter system 200, which saves significant time and effort since accessing the lighting devices 110 at this ceiling height of the shelter system 200 would typically require a ladder.

Further, according to one embodiment, the lighting devices 110 may be attached to the shelter system 200 by means of one or more elongated straps and hook and loop coupling, such as Velcro® hook and loop fasteners.

Specifically, one or more elongated straps 130A and 130B, which may include a fabric material according to one embodiment, of the lighting system 100 extend across a length of a ceiling and/or wall of the transportable shelter system 200, where each elongated strap 130A and 130B, if there are multiple elongated straps, may be spaced apart at approximately the width of each lighting device 110. In one embodiment having multiple elongated straps, the elongated straps 130A and 130B may be positioned substantially parallel, whereas in other embodiments the elongated straps 130A and 130B may be positioned in other arrangements along the interior of the shelter system 200. The one or more elongated straps 130A and 130B may include one or more fasteners/buckles positioned at respective ends of the elongated strap 130A and 130B that are configured to adjust the length of the elongated strap 130A and 130B. In particular, the lighting system 100 may be arranged such that one or more fasteners/buckles positioned at respective ends of the elongated strap 130A and 130B may be positioned at anchor points (e.g., see anchor point 166 of FIG. 2) of the ceiling of the transportable shelter system 200. According to various embodiments, lighting devices 110 may attach to the one or more elongated straps 130A and 130B via a hook strip (e.g., see hook strip 111 of FIG. 8A) that is adhered to the backside of the lighting devices and that is on temporarily attached to one or more loop strips (e.g., see loop strip 132 of FIG. 8A) of the elongated straps 130A and 130B. Further, the elongated straps 130A and 130B may be strung from anchor points (e.g., see anchor point 166 of FIG. 2) of the ceiling such that the lighting devices 110 are secured to the ceiling material of the shelter system 200. Due to the materials (e.g., silicon, carbon nano-tube molecule, rubber, plastic, aluminum, etc.) used in each lighting device 110, the lighting devices 110 are thin and weigh relatively little relative existing shelter lighting systems.

Each lighting device 110 includes a lighting panel that includes a first side and a second side, where the first side includes one or more hook strips (e.g., see hook strip 111 of FIG. 8A) configured to be coupled to the one or more loop strips (e.g., see loop strip 132 of FIGS. 7-8C) integrated with one or more straps 130A and 130B. The second side is configured as a substrate facilitating light emission toward an area proximate the shelter system 200 (e.g., the area within the shelter system). The lighting device 110 includes a flexible circuit board), upon which the LEDs are disposed at regular intervals (e.g., in array form) and includes a double-side substrate used to disperse heat generated from the LEDs. The flexible circuit board allows for the lighting device 110 to flex and fold within a pliable range, thereby allowing the shelter system 200 to be folded or rolled up during takedown without having to remove the lighting devices 110. The lighting device 110 may include a plurality of individual heat radiation pads to surround each LED and receive heat generated by each LED. Further, the lighting devices may be mounted relatively flush with the ceiling to maximize headroom for occupants.

Figure 2:
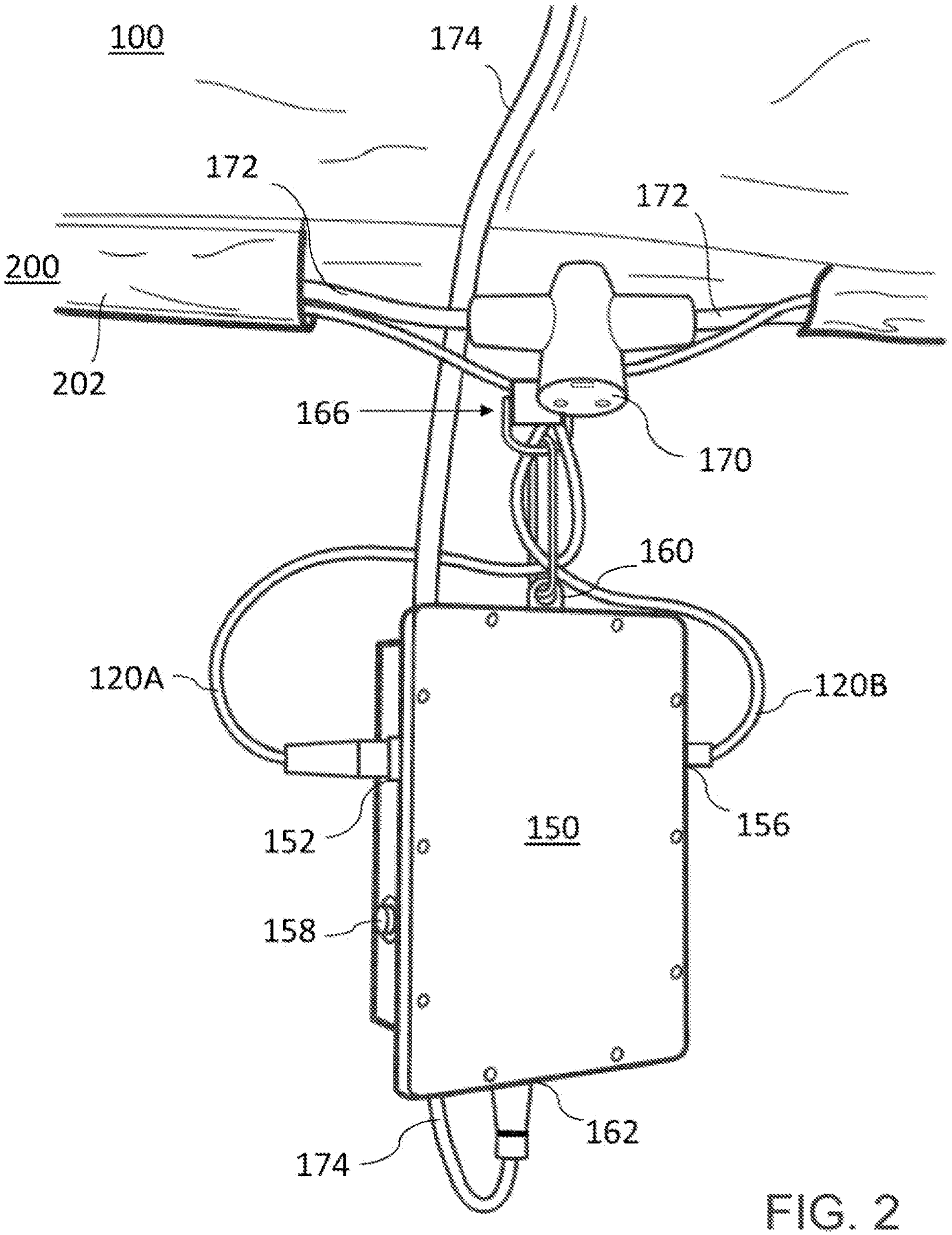
FIG. 2 illustrates a perspective view of a power supply of a lighting system, according to an implementation of the present disclosure.

FIG. 2 illustrates a perspective view of a power supply 150 of a lighting system 100, according to an implementation of the present disclosure. The power supply 150 is configured to provide power to a plurality of lighting devices (e.g., see lighting devices 110 of FIG. 1). In particular, the power supply 150 provides power to a first lighting device (e.g., see lighting devices 110 of FIG. 1) through the first panel cable 120A connected to the power supply 150 at a first quick action connection point 152 and to a second lighting device (e.g., see lighting devices 110 of FIG. 1) through a second panel cable 120B connected at a second panel cable connection point 156 of the power supply 150. The power supply 150 may, according to one embodiment, comprise an LED driver that regulates current to the LEDs within an example range of 150 mA 3000 mA. Because the forward voltage ($V_f$) of an LED changes with temperature, it may be advantageous to provide constant current to the LEDs. According to various embodiments, the power supply 150 may be configured to supply power to multiple lighting devices, or more particularly anywhere between one to four lighting devices (e.g., see lighting devices 110 of FIG. 1). For instance, one supply type may power one to two lighting devices, whereas other power supply types may power one to four lighting devices. In the depicted embodiment, the power supply 150 includes the first quick action panel cable connection point 152, the second quick action panel cable connection point 156, and a third quick action panel connection point 158 where another panel could be connected to the power supply 150. Although not shown, a fourth quick action panel connection point would be located on the same side of the power supply 150 as the second panel cable connection point 156.

Dimming functionality may also be provided to the LEDs based on user input (e.g., via a user interface such as user interface 186 of FIGS. 5A-5D). Although the light intensity availability for the lighting system 100 may be at 100%, the dimming capability of the system may be at least 97% dimmable for "evacuation mode" so that the lighting system 100 is only at approximately 3% intensity for safety. A medium intensity may be at approximately 40% intensity, according to one embodiment. For instance, a low intensity mode may be at least 90% dimmable and more preferably the intensity range of the LEDs may be at approximately 3%-5% intensity. Various other intensity ranges and selections may also be possible based on various pre-programming selections. According to one embodiment, when "black-out" mode is selected, the intensity may not be modified.

Color change functionality may also be provided via the power supply 150. Although not shown, the power supply 150 includes a multi-position switch or multi-selection device that can be configured to provide a programming for what color is provided via the LEDs. According to one embodiment, each LED of a plurality of LEDs included in the lighting device 150 may be configured to emit a respective color, where the desired color may be controlled by the power supply 150. For instance, according to various embodiments, the plurality of LEDs comprise red, green, blue, and white (RGBW) LEDs. Other embodiments may include additional or alternative colors (e.g., yellow). Each LED may produce a respective color based on the material of the diode. The power supply 150 may be programmed to provide a desired color based on the position of the multi-position switch. According to one embodiment, the multi-position switch may be sealed within the watertight housing and may be preprogrammed prior to distribution to the end user. According to various embodiments, since the power supply 150 controls color of the respective lighting devices (e.g., see lighting device 110 of FIGS. 1 and 3) electrically connected thereto, the entire light system 100 may have lighting devices (e.g., see lighting device 110 of FIGS. 1 and 3) programmed to provide different colors. In one non-limiting example, lighting devices (e.g., see lighting device 110 of FIGS. 1 and 3) electrically connected to one power supply (e.g., power supply 150) may be programmed to provide red light, whereas lighting devices electrically connected to a different power supply may be programmed to provide green light, and both power supplies may be daisy chained together and controlled by the same controller.

Figure 4A:
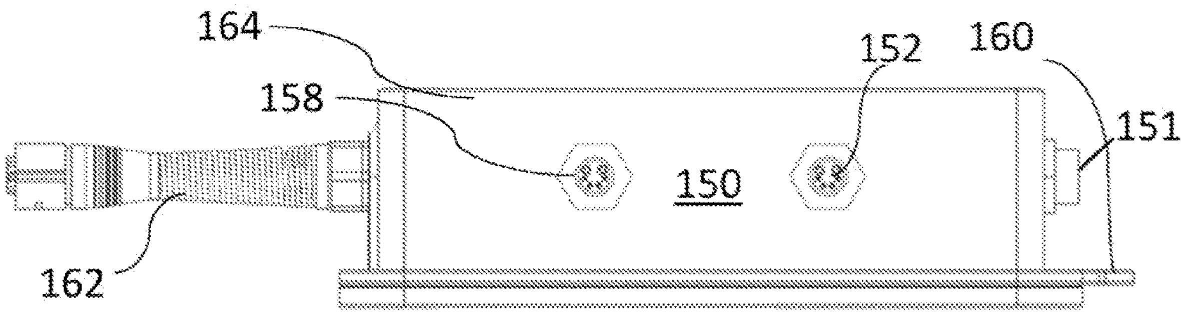
FIG. 4A illustrates a side view of a power supply of a lighting system, according to an implementation of the present disclosure.
Figure 4B:
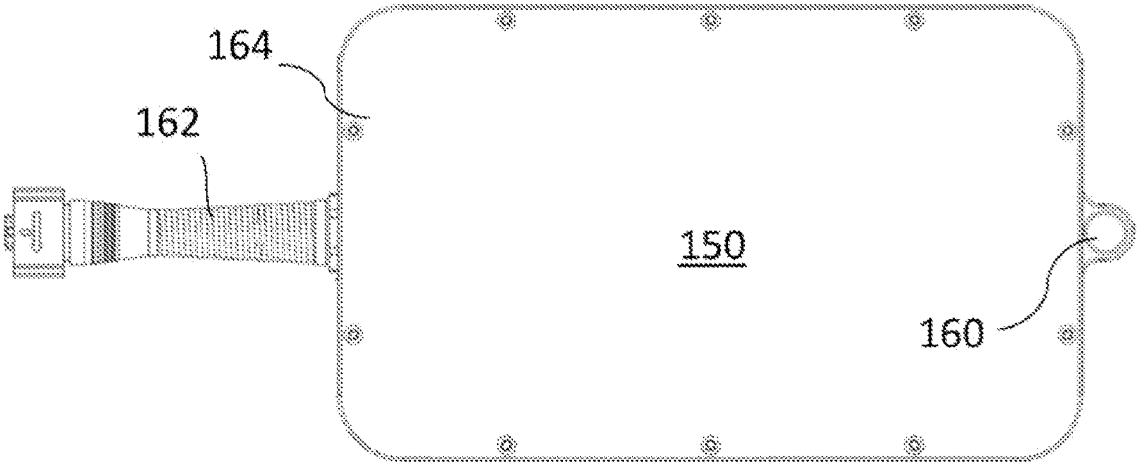
FIG. 4B illustrates a bottom view of the power supply of FIG. 4A, according to an implementation of the present disclosure.
Figure 5A:
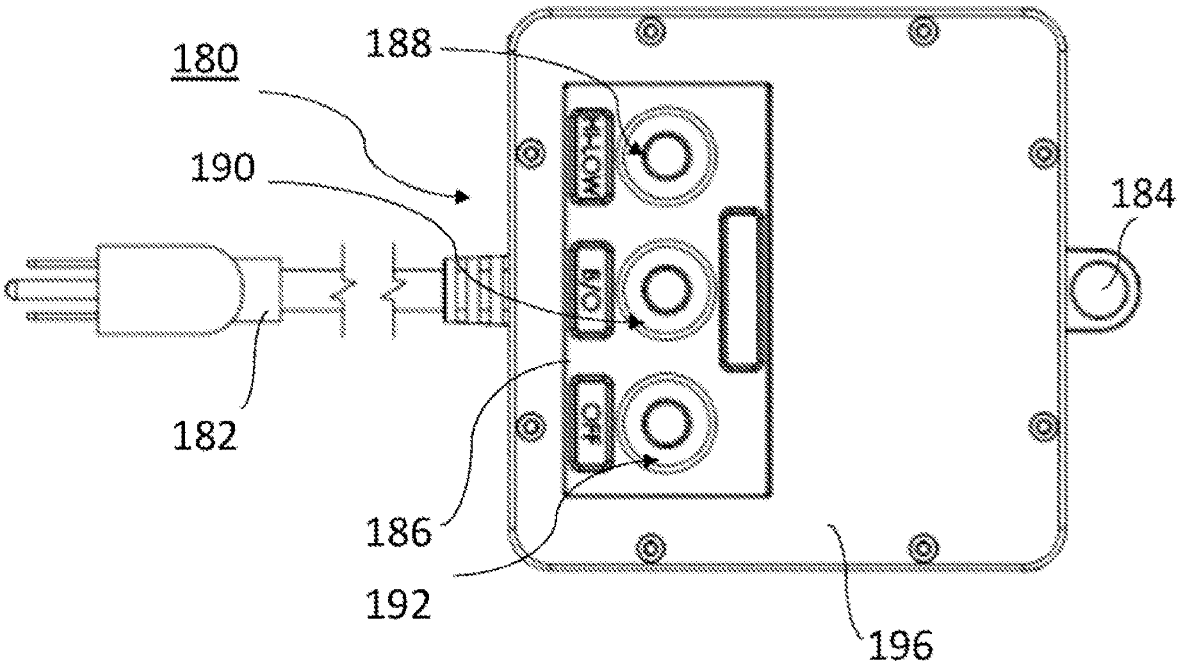
FIG. 5A depicts a top view of a controller of a lighting system, according to an implementation of the present disclosure.
Figure 5B:
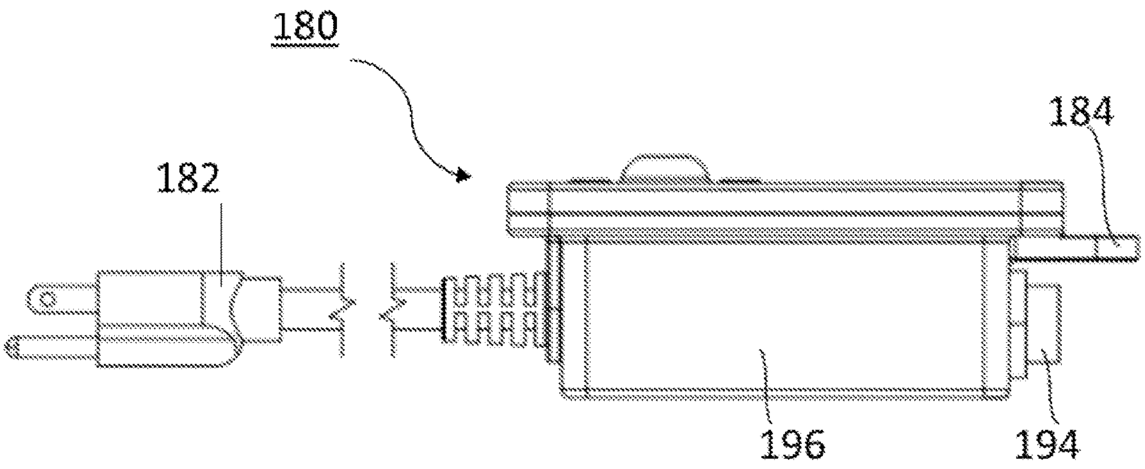
FIG. 5B depicts a first side view of the controller of FIG. 5A, according to an implementation of the present disclosure.
Figure 5C:
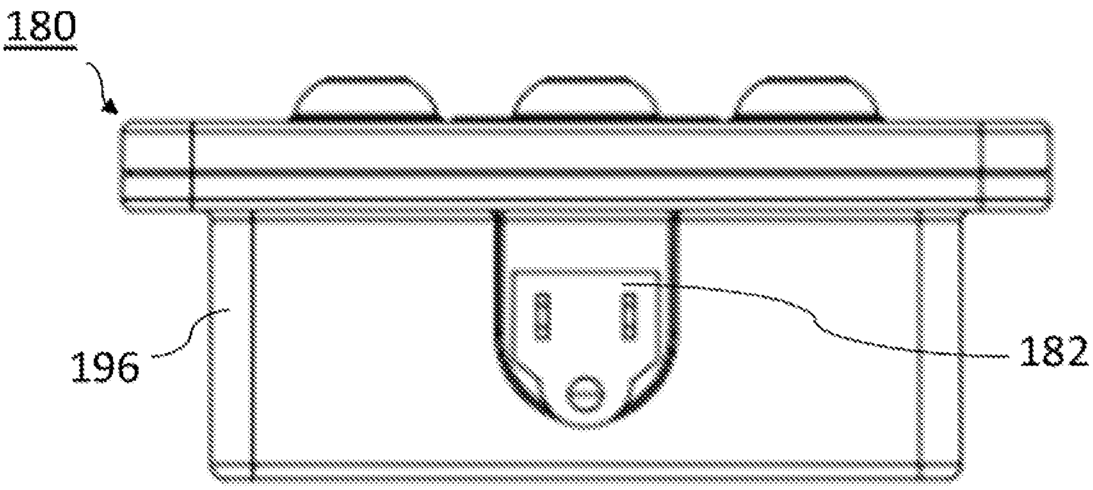
FIG. 5C depicts a first end view of the controller of FIGS. 5A-5B, according to an implementation of the present disclosure.
Figure 5D:
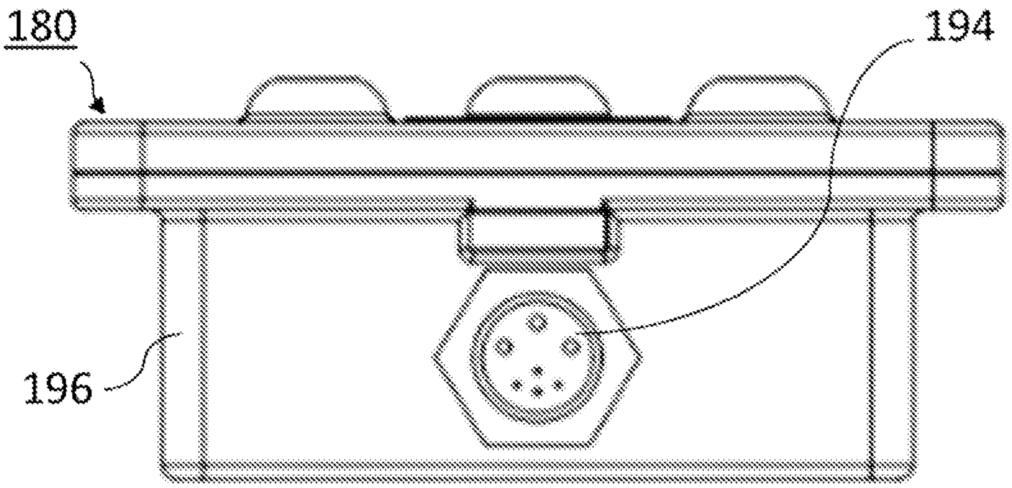
FIG. 5D depicts a second end view of the controller of FIGS. 5A-5C, according to an implementation of the present disclosure.

The power supply 150 is coupled to a controller (e.g., see controller 180 of FIGS. 5A-5D) via an extension cable 174 that is connected to the power supply 150 via a flex connector (e.g., see flex connector 162 of FIGS. 4A and 4B). The controller (e.g., see controller 180 of FIGS. 5A-5D) may then be connected to a power socket 170 (e.g., a two-prong or three-prong socket), which may further be connected to an external power source via power cable 172. The power cable 172 may include a plurality of power sockets, such as power socket 170 at multiple points throughout the shelter system 200 in order to allow multiple convenient connection points to which a connector of the controller (e.g., see connector 182 of controller 180 of FIGS. 5A-5D) can be connected, and/or multiple lighting systems 100 can be connected. In some embodiments, the first panel cable 120A and the second panel cable 120B as well as other cables that are part of the lighting system 100 (e.g., see extension cable 174) may also be funneled through the cable sleeves 202 of the shelter system 200.

The shelter system 200 is configured to be assembled and disassembled multiple times throughout its useful life. The shelter system 200 may include one or more anchor points 166 dispersed at various points across the walls of the shelter system 200 such as near the gaps or openings in the cable sleeves 202. The anchor points 166 may include, for example, a D-ring anchor that is sewn into the walls of the shelter system 200 at an easily accessible height that can be used for support to hang the power supply 150. For instance, the power supply 150 may include a hook 160, which may include a protruding ring that extends from an end of the power supply 150 through which a clip, carabiner, or ring can be attached to hang the power supply 150 at the anchor points 166. The anchor point 166 and/or other anchor points (not depicted) may also be used to attach to the elongated strap(s) (e.g., see elongated fabric straps 130A and 130B of FIG. 1 and elongated strap 130 of FIGS. 7-9).

Figure 3:
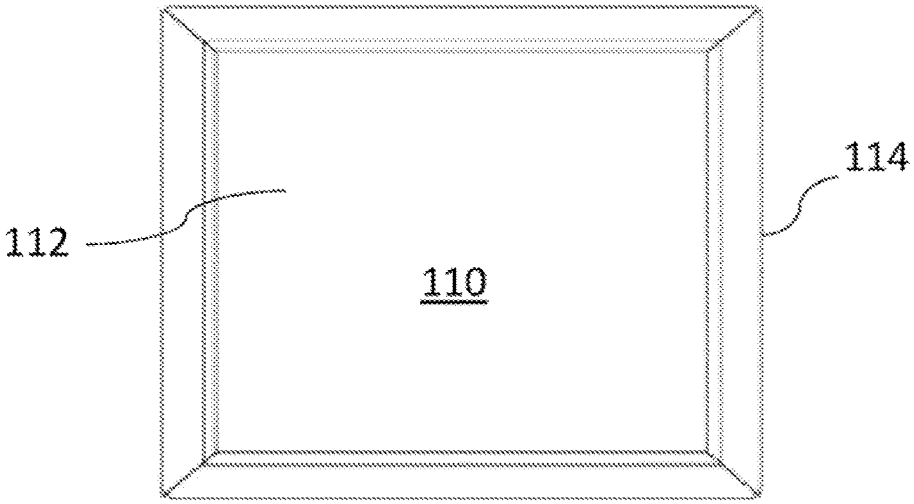
FIG. 3 depicts a perspective view of a lighting device, according to an implementation of the present disclosure.

FIG. 3 depicts a perspective view of an example lighting device 110, according to an implementation of the present disclosure. The lighting device 110 may include a lighting panel having a first side and a second side, where the first side is configured to be coupled, via a hook and loop mechanism to one or more elongated straps (e.g., see elongated fabric straps 130A and 130B of FIG. 1 and elongated strap 130 of FIGS. 7-9), which is then coupled to the shelter system (e.g., see shelter system 200 of FIGS. 1-2). Specifically, the first side includes a hook strip (e.g., see hook strip 111 of FIG. 8A) that is permanently attached thereto that then may be temporarily attached to a loop strip (e.g., see loop strip 132 of FIGS. 7-8C) of an elongated strap (e.g., see elongated fabric straps 130A and 130B of FIG. 1 and elongated strap 130 of FIGS. 7-9). The first side also provides an interface through which panel cable (e.g., see panel cable 120) provides an electrical connection from the power supply (e.g., see power supply 150 of FIG. 2) to the lighting device 110. In addition, the second side of the lighting device 110 includes a casing 112 that includes a light diffusing material (i.e., a diffuser) includes a diffusing fabric (e.g., chiffon, voile, etc.) is positioned proximate the second side to diffuse the light emitted from one or more LEDs located within the lighting device 110. In particular, the casing 112 is positioned in between the LEDs and the area to be illuminated by the LEDs. A housing 114 may include a rubber or synthetic resin material used to fix the perimeter of the lighting device 110 in order to house the lighting panel and keep the casing in place. The lighting panel may include a protective sheet, a heat conduction sheet, a LED module layer that includes the LEDs, and a heat conduction sheet, according to various embodiments. Each lighting device includes at least one casing, and the LEDs of the lighting device are positioned between the at least one casing and the first side (i.e., between the light diffusing material and the backing of the lighting device 150).

FIGS. 4A-4B illustrate different views, specifically a first side view and a bottom view, of a power supply 150 of a lighting system (e.g., see 100 of FIG. 2), according to an implementation of the present disclosure. According to various embodiments, the power supply 150 may be configured to supply power to multiple lighting devices, or more particularly anywhere between one to four lighting devices (e.g., see lighting devices 110 of FIG. 3). The power supply 150 includes a first quick action connection point 152 and a second quick action connection point 158 that are disposed on a first side of a housing 164 of the power supply 150, and similar quick action connection points (not shown but may, for example, mirror first quick action connection point 152 and second quick action connection point 158) disposed on a second side of the housing that is opposite the first side. The first quick action connection point 152, the second quick action connection point 158, and similar quick action connection points (not shown) enable a quick action connection of panel cables (e.g., see first panel cable 120A and second panel cable 120B of FIG. 2). In another embodiment, although not depicted, the power supply 150 may only include a single quick action connection point on the first side and a single quick action connection point on the opposing second side, in which case the power supply 150 would be configured to only connect to between 1-2 lighting devices (e.g., see lighting device 110 of FIG. 3).

The housing 164 includes a configuration designed to prevent water from breaching the power supply 150 so that the power supply 150 is watertight. A hook 160, which may be a ring-shaped protrusion for connecting the power supply 150 to an anchor point (e.g., see anchor points 166 of FIG. 2), may extend outwardly from the housing 164. The power supply 150 also includes a flex connector 162 disposed on a first end, to which an extension cable (e.g., see extension cable 174 of FIG. 2) may be connected. Specifically, the flex connector 162 may be connected at one end to the extension cable (e.g., see extension cable 174 of FIG. 2) and the opposite end of the extension cable (e.g., see extension cable 174 of FIG. 2) may be connected to a controller (e.g., see controller 180 of FIGS. 5A-5D), or another power supply 150 (not shown). In one embodiment, a flex connector 162 may be directly connected to a controller (e.g., see controller 180 of FIGS. 5A-5D), or another power supply 150 (not shown), absent the extension cable (e.g., see extension cable 174 of FIG. 2). At an end of the housing 164 that is opposite the flex connector 162, is an end connection point 151 to which, in some embodiments, another power supply 150 (not shown) may be connected to allow for daisy chaining of multiple power supplies (e.g., power supply 150). The different power supplies 150 may be daisy chained using an extension cable 174 to provide the electrical connectivity, or directly between the flex connector 162 in one power supply 150 and the end connection point 151 in another power supply 150, absent the extension cable 174. Due to the rigidity of the housing 164 of the power supply 150, it is preferable that the power supply 150 be removed during breakdown and transport of the shelter system (see shelter system 200 of FIGS. 1-2) in order to avoid damage to thereto, and the power supply 150 is easy to remove due to the lower height of the anchor points (e.g., see anchor points 166 of FIG. 2).

FIGS. 5A-5D depict top, side, and end views of a controller 180 of a lighting system (e.g., see lighting system 100 of FIGS. 1-2), according to an implementation of the present disclosure. The controller 180 includes a hook 184, which may be a ring-like protrusion disposed at an end of the housing 196 of the controller 180, to be hung at anchor points (e.g., see anchor points 166 of FIG. 2) throughout the shelter system (e.g., see shelter system 200 of FIGS. 1-2) at an accessible height. According to one embodiment, the hook 184 may be sized and shaped or otherwise configured such that a clip, carabiner, or ring can be attached to hang the controller 180 at anchor points 166 (e.g., see anchor points 166 of FIG. 2). Advantageously, the housing 196 includes a configuration that prevents water from breaching the controller 180 so that the controller 180 is watertight. The housing 196 also houses a circuit designed to provide the desired functionalities input via a user interface 186. The user interface 186 is disposed on a surface of the housing 196, and includes various buttons/inputs. According to one non-limiting example, the user interface 186 includes a HI-LOW button 188 that is used to adjust the intensity of the white light between different intensity levels, such as, in a non-limiting example, from a high intensity light to a medium intensity light (e.g., a 100% intensity and a 40% intensity). The user interface 186 also includes a blackout (B/O) button 190 to toggle between the black-out functionality, also called color light functionality, (e.g., red, blue, green, etc.), and white light mode. The (B/O) button 190 may control a multi-position switch (e.g., three-position switch) located in the power supply, which specifies which color light to be used. The user interface 186 also includes an OFF button 192, which turns the system to lowest intensity mode, such as 3% intensity white light in one non-limiting example. These buttons 188, 190, 192 may include a substantially convex, raised configuration disposed onto the housing 196. According to one embodiment, the buttons 188, 190, 192 may remain permanently illuminated so that they are easy to find in the dark.

On opposite ends of the controller 180 are a connector 182 (e.g., a two-pronged or three-pronged electrical plug) capable of providing power to the controller 180, and a quick action connection point 194 to attach to other electrical devices such as, for example, a power supply (e.g., see power supply 150 of FIGS. 4A-4B) via an extension cable (e.g., see extension cable 174 of FIG. 2), or directly, absent the extension cable. Due to the rigidity of the housing 196 of the controller 180, it is preferable that the controller 180 be removed during breakdown and transport of the shelter system (see shelter system 200 of FIGS. 1-2) in order to avoid damage thereto, and the controller 180 is easy to remove due to the low height of the anchor points (e.g., see anchor points 166 of FIG. 2). According to one embodiment, the controller 180 may be configured to operate the entire lighting system (e.g., see lighting system 100 of FIGS. 1-2), which may include a plurality of power supplies (e.g., see power supply 150 of FIGS. 4A-4B), which in turn are electrically coupled to a plurality of lighting devices (e.g., see lighting device 110 of FIGS. 1 and 3).

Figure 6:
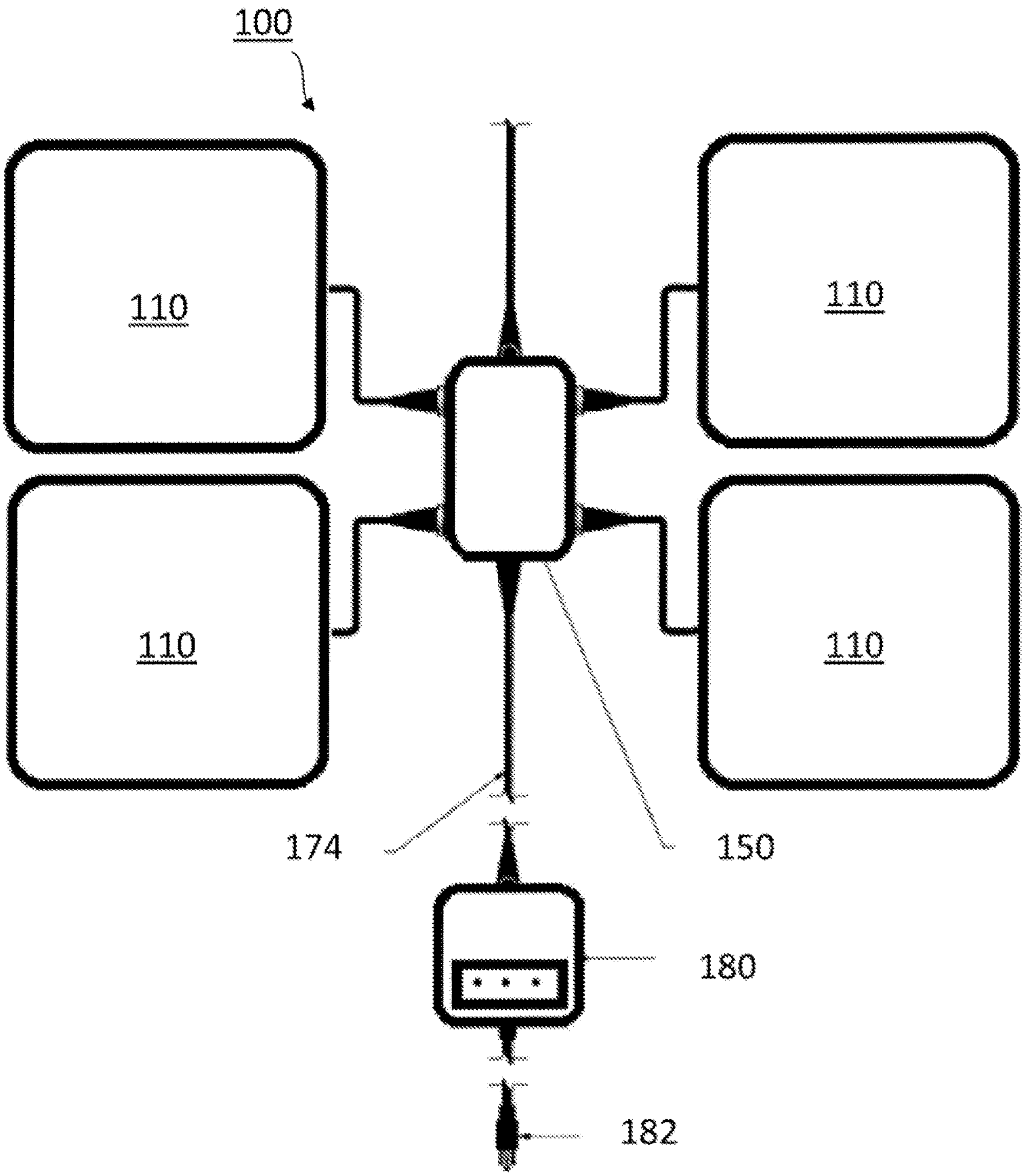
FIG. 6 depicts a schematic diagram of a lighting system, according to an implementation of the present disclosure.

FIG. 6 depicts a schematic diagram of a lighting system 100, according to an implementation of the present disclosure. The lighting system may be configured to have limited electromagnetic emissions to limit a third party from triangulating a signal source or interfere with and/or cause malfunction to other systems in the vicinity of the lighting system 100, (e.g., ordinance systems, medical systems, etc.). In particular, the lighting system 100 may include shielded cables, shielded housing (which may include RF chokes at cable entries), and various other measures to limit electromagnetic emissions. Lighting devices 110 are electrically coupled to a power supply 150 that distributes power to all devices 110 electrically connected thereto. An extension cable 174 electrically couples the power supply 150 to a controller 180, and a connector 182 of the controller 180 may be used to connect to an electrical source to supply energy to the lighting system 100. In various embodiments, the controller 180 and/or power supply 150 may be self-powered (e.g., using a battery, solar energy source, etc.) or may be connected to an external power source (e.g., a generator).

Figure 7:
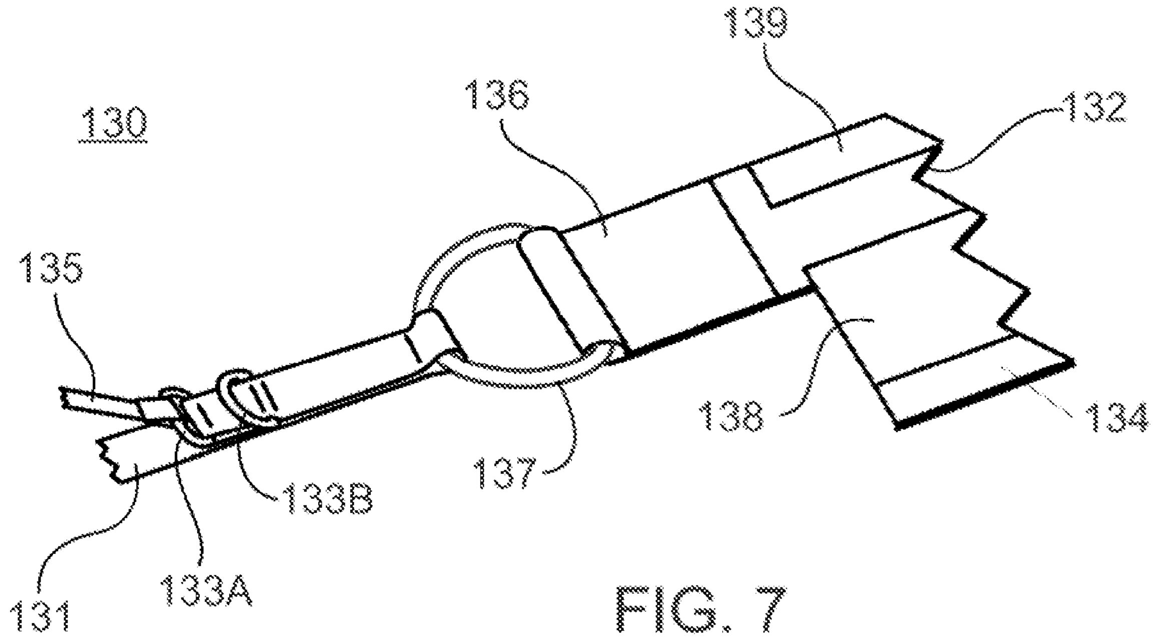
FIG. 7 depicts a perspective view of a portion of an elongated fabric strap according to an implementation of lighting system of the present disclosure.

FIG. 7 depicts a perspective view of an end portion of an elongated fabric strap 130 according to an implementation of a lighting system (e.g., lighting system 100A of FIG. 9) of the present disclosure. For descriptive purposes although only one end of the elongated fabric strap 130 is depicted, the opposite end (not shown) of the elongated fabric strap 130 mirrors the aspects of the end portion depicted and described with reference to FIG. 7. The elongated fabric strap 130 comprises a wide piece of webbing 136 (e.g., 3" webbing) that folds onto itself at one end and traps a first section of a D-ring 137. This webbing 136 is long enough to span the length of the shelter system (e.g., see shelter system 200A of FIG. 9) where it is installed. The D ring 137 is also attached at a second section to a narrower webbing 131 (e.g., 1" wide webbing). The narrower webbing 131 loops around itself and captures two smaller D rings 133A and 133B. The narrower webbing 131 is also long enough to reach the anchor point (e.g., see anchor point 166 of FIG. 2) in the shelter system (e.g., see shelter system 200 of FIG. 2) at each end of the span where it is installed, and also long enough to loop around the anchor point (e.g., see anchor point 166 of FIG. 2) and reach back to D rings 133A and 133B, which provides a non-limiting example embodiment of a fastener, so the elongated fabric strap 130 can be tightened and secured in place via D rings 133A and 133B. In some embodiments, one or more of the D rings 133A and 133B may also be attached to one or more additional narrow straps 135 (e.g., nylon ½" straps) that can be pulled to loosen the elongated fabric strap 130.

The webbing 136 has two sides, a first side and a second side opposite the first side. On the first side of the webbing 136, which is depicted for the purposes of FIG. 7 on the underside of the elongated fabric strap 130, and along a first edge it has loop strip 132 that is approximately the same width (e.g., 3") as the webbing 136 that is permanently attached thereto. On its second side, which is depicted for the purposes of FIG. 7 on the top side of the elongated fabric strap 130 opposite the first side, it has a strip of narrow loop strip 139 that is permanently attached along the first edge of the second side of webbing 136. The webbing 136 also has a flap 138 made of flexible but durable material (e.g., Cordura® fabric). This flap 138 has a first side, which for the purposes of illustration in FIG. 7 is the underside of the flap 138, and a second side, which for the purposes of illustration in FIG. 7 is the top side of the flap 138 opposite the first side. The first edge of the first side of flap 138 partially overlaps the second side of the webbing 136 across a small area (e.g., 0.5") and runs along the second edge of the second side of webbing 136. A narrow hook strip 134 (e.g., 1") is permanently installed on the second side of flap 138, along the second edge of flap 138.

Figure 8A:
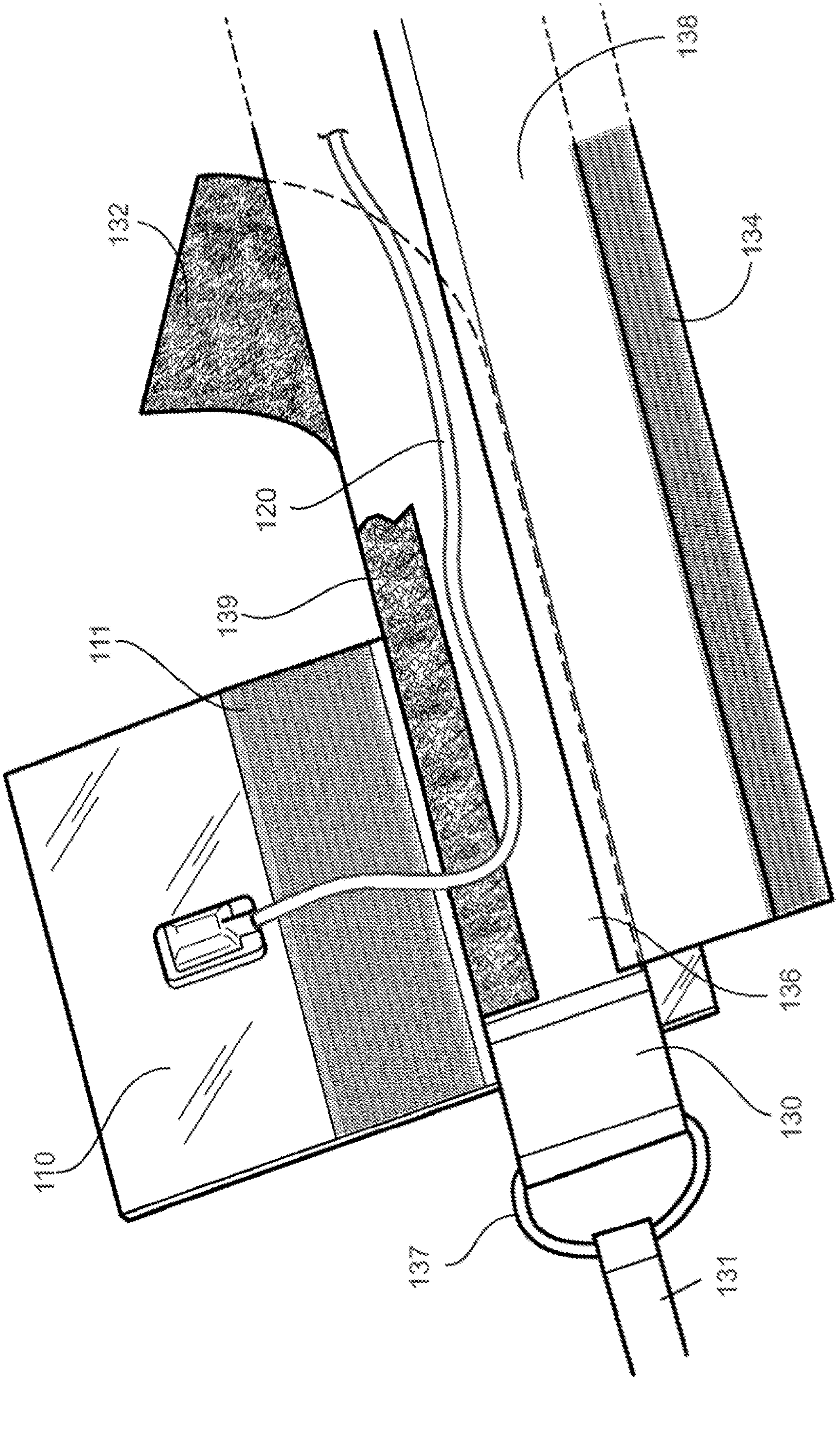
FIG. 8A depicts a perspective view of a portion of a lighting system in which a lighting device is attachable to a strap, according to an implementation of the present disclosure.

FIG. 8A depicts a perspective view of a portion of a lighting system (e.g., lighting system 100A of FIG. 9) in which a lighting device 110 is temporarily attachable, via a hook and loop mechanism, to a strap 130, according to an implementation of the present disclosure. The hook and loop mechanism includes a loop strip 132 permanently attached to the underside or first side, and along a first edge, of the elongated fabric strap 130. The loop strip 132 is configured to temporarily attach with the corresponding hook strip 111 of the lighting device 110. Also along the first edge of the elongated fabric strap 130, and along the top side or second side, opposite the loop strip 132 is another loop strip 139 that is positioned such that the flap 138 can fold back on itself such that the hook strip 134 on the flap 138 can temporarily attach to the loop strip 139 forming a sleeve to hide the panel cable 120. The strap 130 is installed within the shelter system (e.g., see shelter system 200A of FIG. 9) via the narrower webbing 131 in conjunction with the D rings (e.g., see the two smaller D rings 133A and 133B of FIG. 7) and the panel cable 120 is channeled along the length of the strap 130 until it attaches to a power supply (e.g., see power supply 150 of FIG. 2).

Figure 8B:
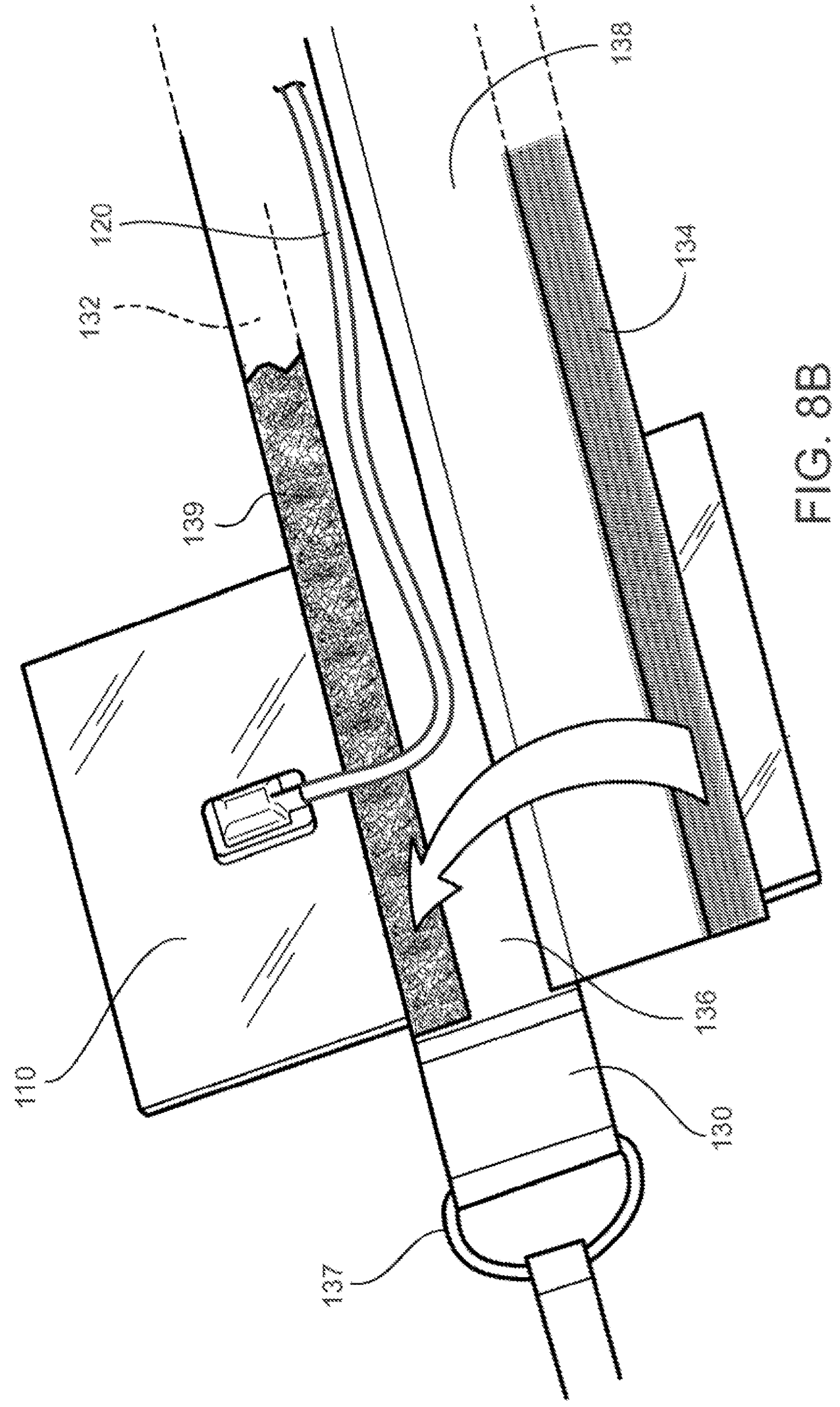
FIG. 8B depicts a perspective view of the portion of the lighting system of FIG. 8A in which the lighting device is attached to the strap prior to the strap being used to encase the panel cable, according to an implementation of the present disclosure.
Figure 8C:
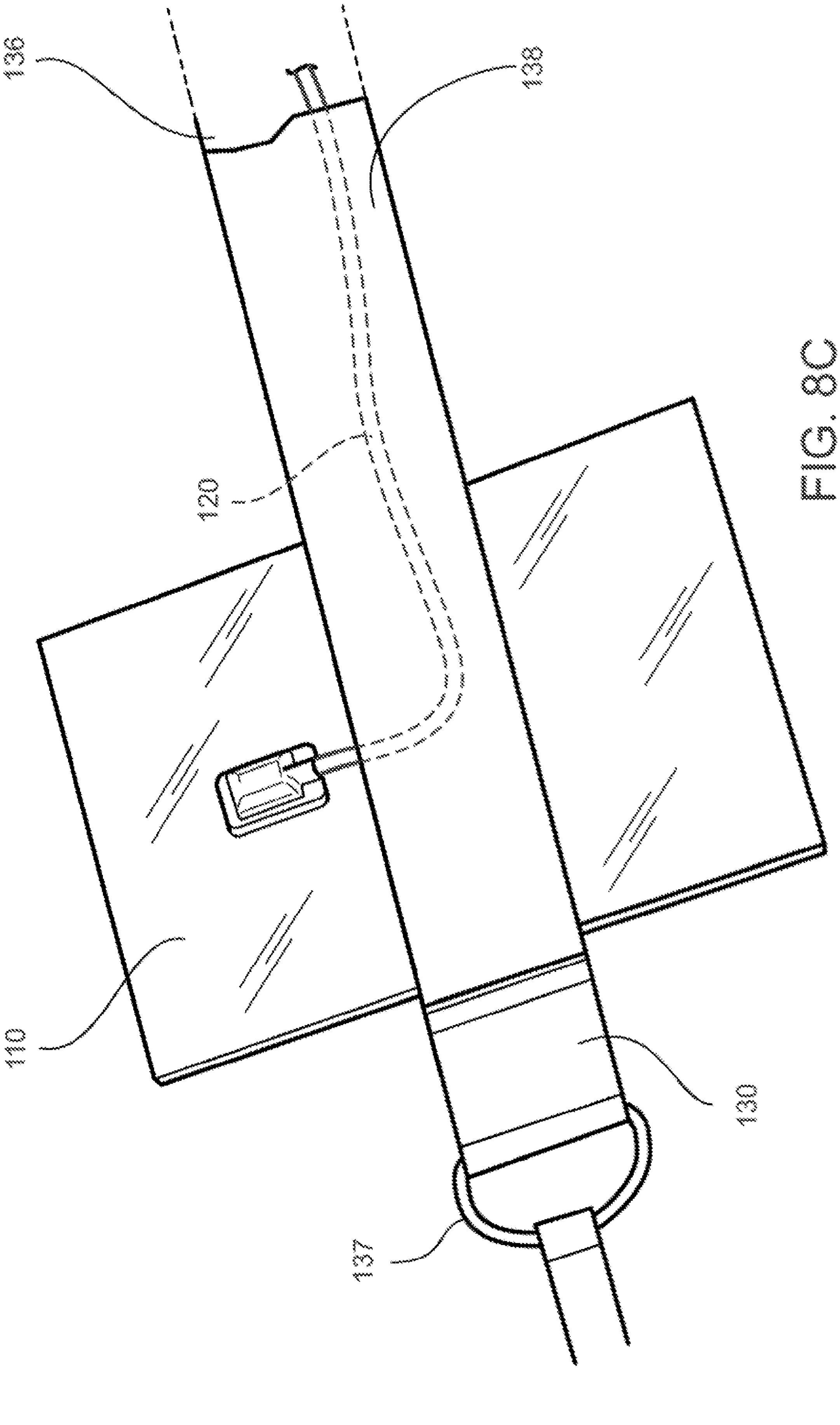
FIG. 8C depicts a perspective view of the portion of the lighting system of FIGS. 8A and 8B in which a flap is being used to encase the panel cable, according to an implementation of the present disclosure.

FIG. 8B depicts a perspective view of the portion of the lighting system (e.g., lighting system 100A of FIG. 9) of FIG. 8A in which the lighting device 110 is attached to the strap 130 prior to the strap 130 being used to encase the panel cable 120, according to an implementation of the present disclosure. The arrow is used to illustrate the flap 138 folding back on itself such that the hook strip 134 attaches to the loop strip 139. Further, FIG. 8C depicts a perspective view of the portion of the lighting system (e.g., lighting system 100A of FIG. 9) of FIGS. 8A and 8B in which the flap 138 is being used to encase the panel cable 120, according to an implementation of the present disclosure.

Figure 9:
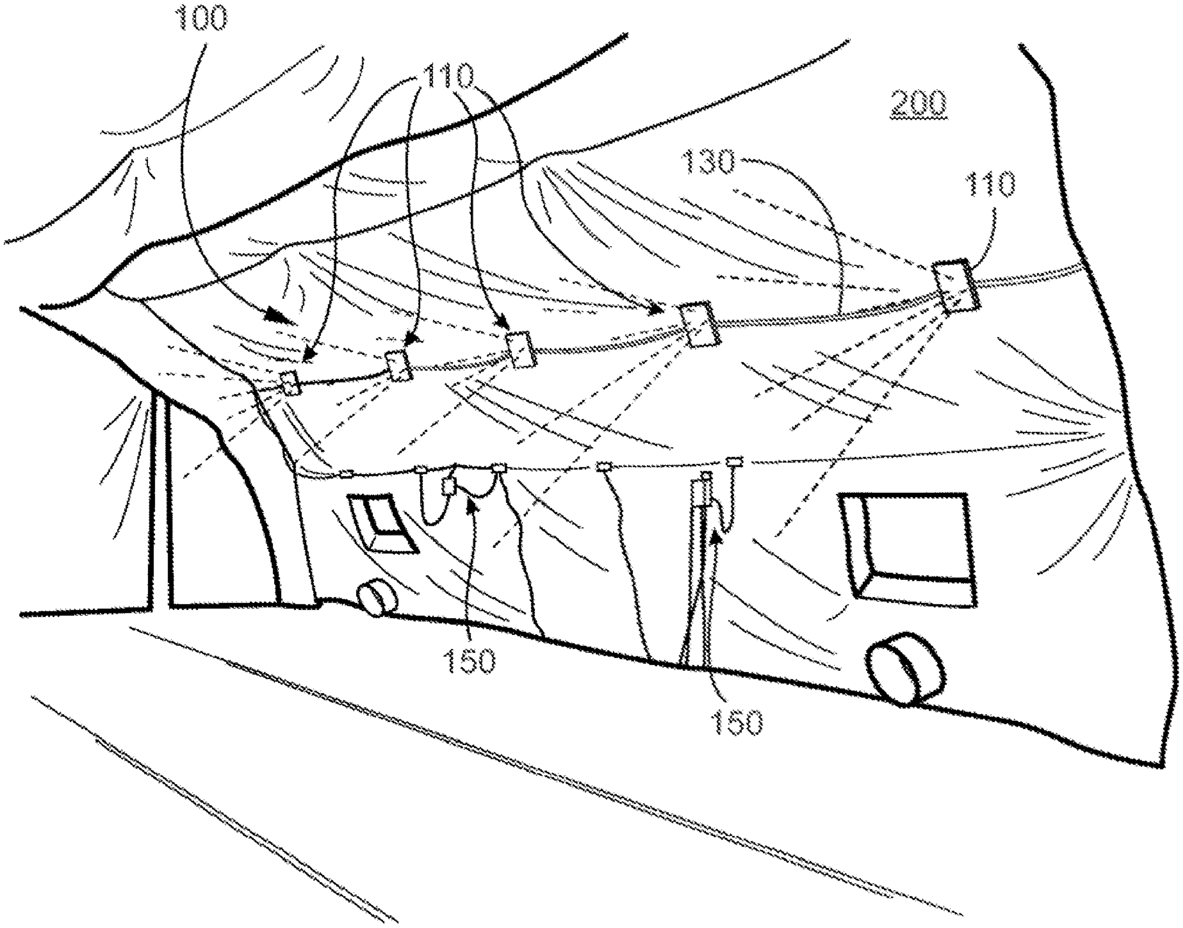
FIG. 9 depicts an example lighting system installed within a shelter system, according to an implementation of the present disclosure.

FIG. 9 depicts an example lighting system 100A installed within a shelter system 200A, according to an implementation of the present disclosure. The lighting system 100A is similar to the lighting system 100 of FIG. 1 where a plurality of electrically interconnected lighting devices 100 are positioned at various locations along a length of a ceiling and/or wall on the interior of the shelter system 200A utilizing elongated fabric straps 130A and 130B; however, the lighting system 100A utilizes a single strap 130 (e.g., see elongated fabric strap 130 of FIGS. 7-8C) to which the lighting devices 100 are attached. Further, the panel cables (e.g., see panel cable 120 of FIGS. 8A-8C) are routed through a flap (e.g., see flap 138 of FIGS. 7-8C) of the strap 130 and eventually connect to the respective power supply(s) 150.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A lighting system, comprising:

a plurality of electrically interconnected lighting devices, each lighting device of the plurality of electrically interconnected lighting devices comprising a flexible lighting panel comprising a first side and a second side, the first side comprising one or more hook strips configured to be coupled to one or more loop strips integrated with at least one elongated strap configured to be coupled to a transportable shelter system, the second side configured as a substrate facilitating light emission toward an area proximate the transportable shelter system, the flexible lighting panel comprising at least one light casing positioned proximate the second side and comprising one or more LEDs positioned between the at least one light casing and the second side, the at least one light casing comprising a light diffusing material configured to diffuse light emitted by the one or more LEDs;

at least one power supply electrically connected via one or more electrical connectors to one or more lighting devices of the plurality of electrically interconnected lighting devices; and a controller electrically connected via at least one electrical connector to the at least one power supply; and the at least one elongated strap comprising the one or more loop strips and configured to be coupled to the transportable shelter system;

wherein the at least one elongated strap comprises:

a fabric material including a webbing having a first side and a second side opposite the first side;

a fastener configured to adjust a length of the at least one elongated strap;

at least one of the one or more loop strips integrated on a second side of the elongated strap opposite a first side; and a flap extending from the second side of the at least one elongated strap and comprising a hook strip, wherein the flap is configured to fold over to form a channel by temporarily attaching the hook strip to the at least one of the one or more loop strips, wherein the channel formed by folding over the flap is configured to encase the one or more electrical connectors.

2. The lighting system of claim 1, wherein the transportable shelter system is configured to be assembled and disassembled multiple times throughout its useful life.

3. The lighting system of claim 1, wherein each casing of the at least one light casing comprises the one or more LEDs positioned between the at least one light casing and the first side, wherein the one or more LEDs comprise a plurality of LEDs, and each LED of the plurality of LEDs is configured to emit a respective color.

4. The lighting system of claim 1, wherein the at least one power supply comprises at least one hook for temporarily hanging the at least one power supply to an anchor point of the transportable shelter system.

5. The lighting system of claim 1, wherein the one or more LEDs comprise a plurality of LEDs, and wherein the plurality of LEDs comprise RGBW LEDs.

6. The lighting system of claim 1, wherein the at least one elongated strap comprises an elongated fabric strap positioned along the length of a ceiling of the transportable shelter system, the elongated fabric strap being connected to the one or more hook strips of the flexible lighting panel.

7. The lighting system of claim 1, wherein the at least one power supply comprises a plurality of power supplies electrically connected in series.

8. The lighting system of claim 1, wherein the at least one power supply comprises a plurality of power supplies and the controller is configured to control each of the plurality of power supplies.

9. The lighting of claim 1, wherein the controller comprises a user interface that includes plurality of illuminated input controls.

10. The lighting system of claim 1, each power supply of the at least one power supply is configured to power multiple lighting devices of the plurality of electrically interconnected lighting devices.

11. The lighting system of claim 1, wherein the controller comprises at least one hook for temporarily hanging the controller to an anchor point of the transportable shelter system.

12. A lighting device, comprising a flexible lighting panel comprising a first side and a second side, the first side comprising one or more hook strips configured to be coupled to one or more loop strips integrated with at least one elongated strap configured to be coupled to a transportable shelter system, the second side configured as a substrate facilitating light emission toward an area proximate the transportable shelter system, the flexible lighting panel comprising at least one light casing positioned proximate the second side and comprising one or more LEDs positioned between the at least one light casing and the second side, the at least one light casing comprising a light diffusing material configured to diffuse light emitted by the one or more LEDs, the lighting device configured to be electrically connected via one or more electrical connectors;

wherein the at least one elongated strap comprises:

a fabric material including a webbing having a first side and a second side opposite the first side;

a fastener configured to adjust a length of the at least one elongated strap;

at least one of the one or more loop strips integrated on a second side of the elongated strap opposite a first side; and a flap extending from the second side of the at least one elongated strap and comprising a hook strip, wherein the flap is configured to fold over to form a channel by temporarily attaching the hook strip to the at least one of the one or more loop strips, wherein the channel formed by folding over the flap is configured to encase the one or more electrical connectors.

13. The lighting device of claim 12, wherein the transportable shelter system is configured to be assembled and disassembled multiple times throughout its useful life.

14. The lighting device of claim 12, wherein each casing of the at least one light casing comprises the one or more LEDs positioned between the at least one light casing and the first side, wherein the one or more LEDs comprising a plurality of LEDs, and each LED of the plurality of LEDs is configured to emit a respective color.

15. The lighting device of claim 12, wherein the lighting device is configured to be electrically connected to a first end of an electrical cable, the electrical cable comprising a length extending from the first end to a second end opposite the first end, and wherein the electrical cable is configured to electrically connect the lighting device to a power supply.

16. The lighting device of claim 12, wherein the one or more LEDs comprising a plurality of LEDs, wherein the plurality of LEDs comprise RGBW LEDs.

17. The lighting device of claim 12, wherein the at least one elongated strap comprises an elongated fabric strap positioned along the length of a ceiling of the transportable shelter system, the elongated fabric strap being connected to the one or more hook strips of the flexible lighting panel.

* * * * *